United States Patent [19]

Tanaka et al.

[11] Patent Number: 5,493,693

[45] Date of Patent: * Feb. 20, 1996

[54] MOBILE RADIO COMMUNICATION SYSTEM UTILIZING MODE DESIGNATION

[75] Inventors: Masayuki Tanaka; Koichi Ito, both of Tokyo, Japan

[73] Assignee: Kabushiki Kaisha Toshiba, Japan

[ * ] Notice: The portion of the term of this patent subsequent to Apr. 12, 2011, has been disclaimed.

[21] Appl. No.: 226,686

[22] Filed: Apr. 12, 1994

Related U.S. Application Data

[63] Continuation of Ser. No. 727,594, Jul. 9, 1991, Pat. No. 5,335,355.

[30] Foreign Application Priority Data

Jul. 9, 1990 [JP] Japan .................................. 2-179527

[51] Int. Cl.$^6$ ................................ H04B 7/26; G04Q 7/32
[52] U.S. Cl. ....................... 455/33.1; 455/33.2; 455/54.2; 455/89; 375/216; 379/59
[58] Field of Search ................................. 455/33.1, 33.2, 455/54.1, 54.2, 73, 78, 89, 34.1; 375/5, 216; 379/59, 58, 60, 63

[56] References Cited

U.S. PATENT DOCUMENTS

| | | | |
|---|---|---|---|
| 4,837,858 | 6/1989 | Ablay et al. | 455/34.1 |
| 5,020,076 | 5/1991 | Cahill et al. | 375/5 |
| 5,056,109 | 10/1991 | Gilhousen et al. | 375/1 |
| 5,119,397 | 6/1992 | Dahlin et al. | 375/5 |
| 5,127,042 | 6/1992 | Gillig et al. | 379/59 |
| 5,228,074 | 7/1993 | Mizikovsky | 379/59 |
| 5,309,502 | 5/1994 | Hirai | 379/58 X |
| 5,335,355 | 8/1994 | Tanaka et al. | 455/33.1 |

*Primary Examiner*—Chi H. Pham
*Attorney, Agent, or Firm*—Banner & Allegretti, Ltd.

[57] ABSTRACT

A mobile radio communication system is provided with a base station apparatus connected to a wire circuit, a mobile radio station apparatus which is connected to the base station apparatus by means of a radio circuit, a mode designation device for selecting either an analog mode or a digital mode when radio communication is to be performed between the base station apparatus and the mobile radio station apparatus, and a mode-informing device for informing the base station apparatus of the mode designated by the mode designation device.

13 Claims, 15 Drawing Sheets

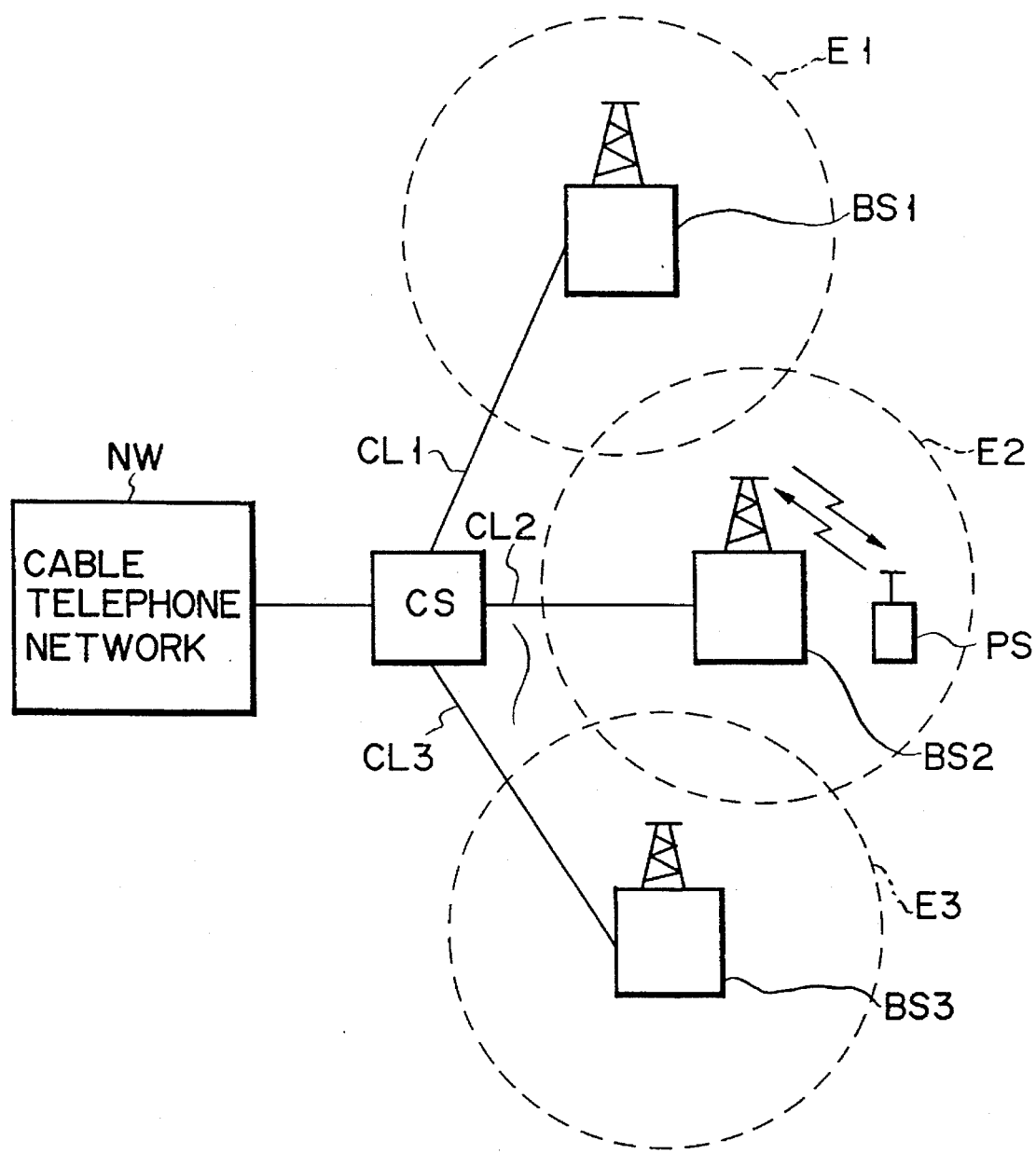
F I G. 1

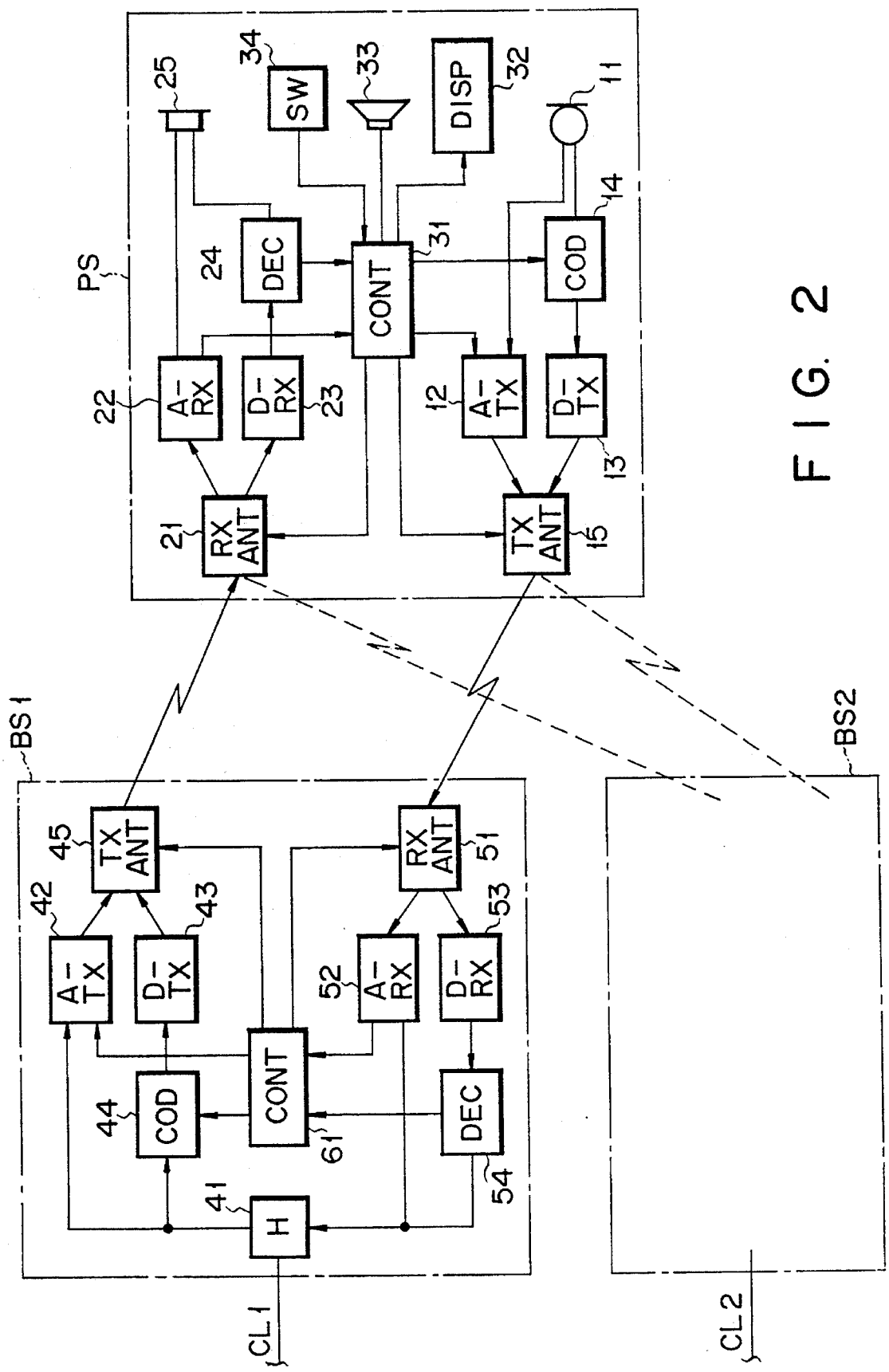
F I G. 2

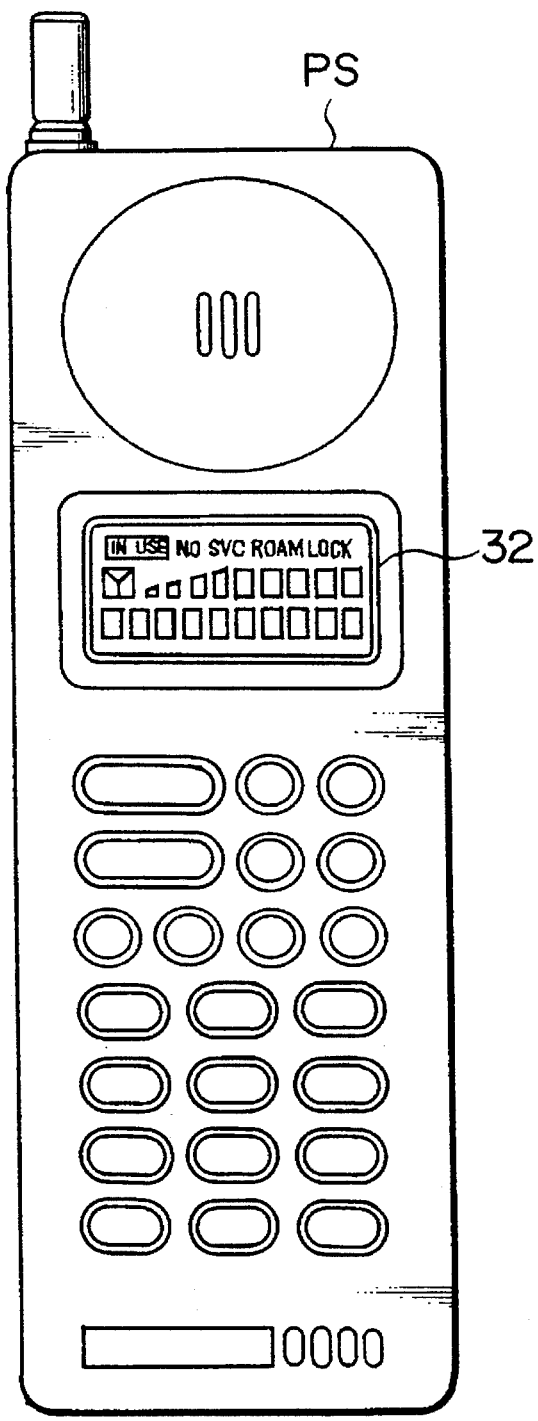
F I G. 9

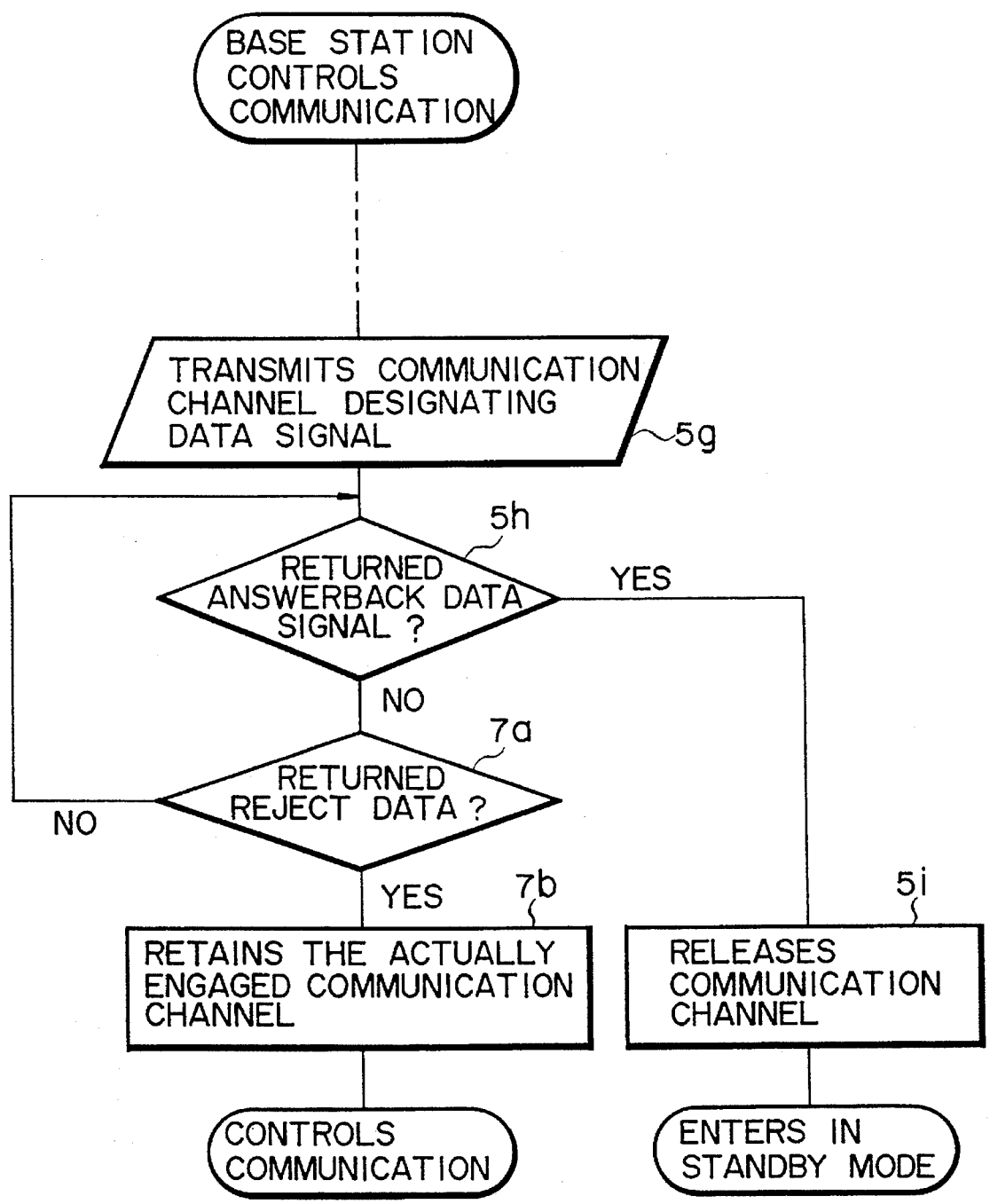
F I G. 12

MOBILE RADIO COMMUNICATION SYSTEM UTILIZING MODE DESIGNATION

This application is a continuation of application Ser. No. 07/727,594, filed Jul. 9, 1991 now U.S. Pat. No. 5,335,355.

BACKGROUND OF THE INVENTION

1. Field of the Invention

The present invention relates to a mobile radio communication system like an automobile telephone system, or a portable telephone system, or a cordless telephone system, or the like. More particularly, the invention relates to a cellular radio communication system which is capable of selectively using either analog mode of digital mode when exchanging radio communication between a base station and a mobile radio station apparatus.

2. Description of the Related Art

Recently, as one of cellular mobile radio communication systems, there is a proposal on such a system which introduces a dual-mode communication by alternatively applying either analog mode or digital mode as required. The proposed dual mode radio communication system comprises a plurality of base stations which are respectively connected to a control station via a plurality of wire circuits and a plurality of mobile radio stations. Each base station has its own radio zone. Each mobile radio station is connected to each base station via a radio circuit in a specific radio zone allocated for each base station.

Either the analog mode or the digital mode is available for such a communication system using radio circuits. When the analog mode is selected, the transmitter angle-modulates a carrier signal in accordance with a voice signal and data and transmits the angle-modulated carrier signal. On the other hand, the receiver initially receives the angle-modulated carrier signal from the transmitter and angle-demodulates the received carrier signal to reproduce the voice signal and the data. On the other hand, when the digital mode is selected, initially, the transmitter digitally encodes voice signal and data, and then modulates a carrier signal by the digitally coded signal before transmitting the modulated carrier signal. The receiver receives the modulated carrier signal from the transmitter, and then demodulates the received carrier signal. Finally, the demodulated signal is decoded before eventually reproducing both the aural signal and the data. When executing a radio communication by the digital mode, a plurality of time slots are transmitted, using a single radio frequency, in accordance with the time-sharing multiplex communication system.

Generally, when executing a radio communication in the analog mode, since the content of speech is transmitted merely by directly modulating a carrier signal by voice signal and data, the content of speech can easily be received by any conventional general-purpose radio receiver. In other words, the content of speech may easily be tapped by any third party, and thus, the security rate is extremely low. Conversely, the time-sharing multiplex communication system is introduced to the digital-mode radio communication. Since all the aural signals and data are digitally coded, even though any third party receives the carrier-wave frequency, he cannot correctly understand the spoken aural signals and data from the digitally coded signal received by his receiver unit. In the other words, the radio communication based on the digital mode provides an extremely high security rate. Based on this reason, it is probable that when the operator desires to engage in a highly confidential communication requiring security, he prefers to apply such a radio communication system capable of securely selecting the digital mode.

Nevertheless, conventionally, any base station unilaterally selects a radio communication system available for either transmission or reception according to the vacancy of available speech channel. In other words, only the base station can unilaterally select either the analog mode or the digital mode. Because of this, even when a user is anxious to telephone-communicate in the digital mode, he can hardly meet his demand. Furthermore, even when the base station selects the digital mode, the user cannot identify that the digital mode has been selected by the base station. As a result, the user cannot identify whether he can actually telephone-communicate with security, or not. In many cases, users are obliged to give up themselves to engage in a highly confidential communication for the security sake.

SUMMARY OF THE INVENTION

An object of the invention is to provide a novel cellular radio communication system which permits a user to optionally designate the desired radio communication format so that he can more effectively utilize digital communication mode in particular.

Another object of the invention is to provide a novel cellular radio communication system which permits a user to perceive the actually entered radio communication format so that he can optionally change the content of communication based on the actually entered radio communication format.

According to the cellular radio communication system embodied by the invention, a base station apparatus connected to wire circuits and a mobile radio station apparatus connected to this base station via radio circuit are provided. The cellular radio communication system selectively executes either the analog mode or the digital mode when activating a radio communication between the base station and the mobile radio station. Of these, the mobile radio station apparatus incorporates a mode designating signal input device and a selected-mode informing device. The mode designating signal input device designates and executes either the analog mode or the digital mode to implement a radio communication between the base station apparatus and the mobile radio station apparatus. The mobile radio station apparatus informs the base station apparatus of the mode data designated and activated by the mode designating signal input device before starting a radio communication. On the other hand, the base station apparatus incorporates a radio communication format entry device. The radio communication format entry device selects a specific radio communication format in response to the mode designating data transmitted from the mobile radio station apparatus.

According to another embodiment of the invention, a device for informing the actually entered radio communication format is provided, which informs both the transmitting and receiving parties of a specific radio communication format actually entered between the base station apparatus and the mobile radio station apparatus before starting a radio communication between them. In other words, the informing device informs both the transmitting and receiving parties that the analog mode is selected, or the digital mode is selected.

Therefore, according to the invention, whenever necessary, the user can optionally designate the desired radio communication format by operating the mobile radio communication apparatus. Availing of this advantage, the user can optionally engage in a well-secured radio communication as per the content of desired speech and the desired mode. For example, when the user needs to enter into a confidential radio communication requiring security, he can designate activation of the digital mode so that he can follow up the radio communication in the well-secured condition. Conversely, when he enters into an open radio communication deserving no security, he can freely keep on talking without specifying the available mode.

According to a still further object of the invention, before and on the way of exchanging a communication, the user can always be aware of the actually entered radio communication format by correctly identifying either the analog mode or the digital mode. Availing of this advantage, the user can optionally enter into a well-secured radio communication while the digital mode is executed. Conversely, when the analog mode is selected, he can refrain himself from entering into such a radio communication requiring security.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 schematically shows an overall composition of the cellular radio communication system embodied by the invention;

FIG. 2 schematically shows the composition of the cellular radio communication system according to an embodiment of the invention;

FIG. 9 shows the plan of the mobile radio station;

FIGS. 11A through 12 respectively show operational flowcharts describing the sequence of controlling the mobile radio station and the base station of the cellular radio communication system according to another embodiment of the invention.

DETAILED DESCRIPTION OF THE PREFERRED EMBODIMENTS

Figure 3:
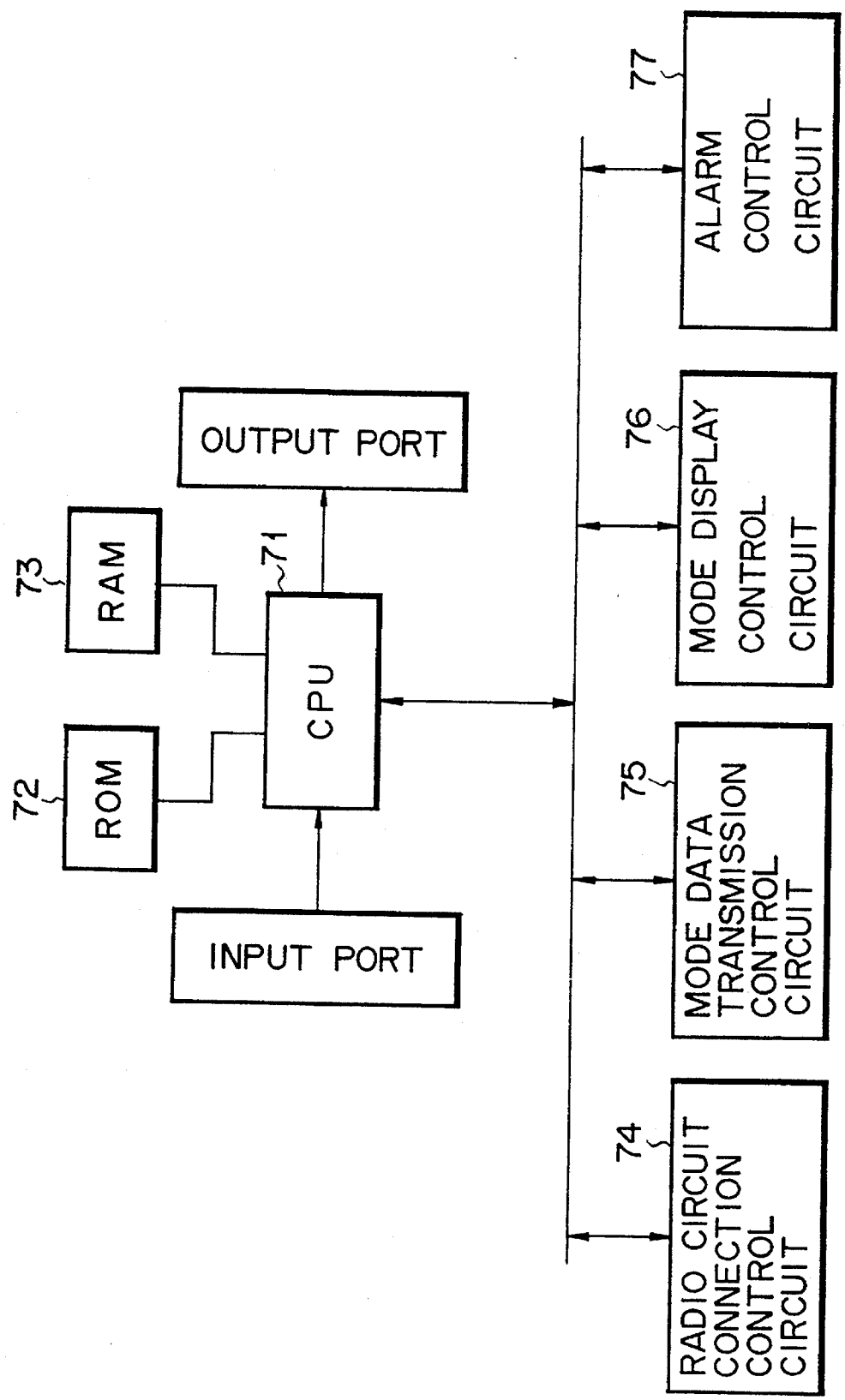
FIG. 3 schematically shows the control circuit of the cellular radio communication system shown in FIG. 2.

The speech communication link may be a conventional analog link or a digital link wherein speech signals are encoded and TDMA (Time Divisional Multiple Access) method is applied.

The unique features of the present invention may be applied to the cellular system such as the above mentioned. It should be noted that the standard neither requires nor suggests the unique features of the present invention. However, the unique features of the present invention may be added to the cellular radio telephone meeting the requirements of the standard, whereby a great convenience is provided to the user of the cellular radio telephone.

It is needless to say that the unique features of the present invention may be applied to similar radio systems other than the system meeting the requirements of the standard.

Embodiments of the present invention will be described hereinafter in conjunction with the accompanying drawings. In the embodiments, the entire systems and the mobile radio stations are assumed to operate in accordance with "Dual-Mode Mobile Station—Base Station Compatibility Standard for Cellular Systems" issued from EIA, December 1989. In the system, several control channels consisting of a prescribed range of frequency are available for either analog mode transmission or digital mode transmission. After transmitting control data over the control channels, a speech communication link may be established between a base station and a mobile radio station over speech communication channels under control of the base station.

FIG. 1 shows the total composition of the cellular radio communication system according to an embodiment of the invention. The cellular radio communication system comprises the following; a control station CS which is connected to a wire telephone network NW, a plurality of base stations BS1 through BS3 which are respectively connected to the control station CS via the wire circuits CL1 through CL3, and a plurality of mobile radio stations PS1 through PSn (FIG. 1 merely illustrates a mobile radio station PS).

Each of these base stations BS1 through BS3 has its own radio zones E1 through E3. The mobile radio station PS is connected to each of those base stations BS1 through BS3 via radio circuit in those radio zones E1 through E3 of each of those base stations BS1 through BS3.

As shown in FIG. 2, the mobile radio station PS includes a transmission section, a reception section, and a control section. The transmission section comprises a transmitter 11, an analog modulator (A-TX) 12, a digital modulator (D-TX) 13, a coder (COD) 14, and a transmission antenna (TXANT) 15. On receipt of a carrier signal, the analog modulator 12 angle-modulates the received carrier signal by means of a transmission voice signal output from the transmitter 11 and a control data from a control circuit 31 (this will be described later on). The coder 14 digitally encodes the transmission talking signal delivered from the transmitter 11 and the control data from the control circuit 31. The digital modulator 13 modulates the carrier signal by means of the coded transmission voice signal and the coded control data from the coder 14. In response to the switching instruction output from the control circuit 31, the transmission antenna 15 alternatively switches the analog signal output from the analog modulator 12 and the digital signal from the digital modulator 13.

The reception section comprises a reception antenna 21, an analog demodulator 22, a digital demodulator 23, a decoder 24, and a receiver 25. On receipt of the modulated carrier signal transmitted from the base station BS via a radio circuit, based on the switching instruction from the control circuit 31, the reception antenna 21 delivers the modulated carrier signal to the analog demodulator 22 or the digital demodulator 23. The analog demodulator 22 angle-demodulates the modulated carrier signal delivered from the reception antenna 21, thus reproducing a reception voice signal. Then, the reproduced talking signal is delivered to the receiver 25, whereas the control data is delivered to the control circuit 31. The digital demodulator 23 digitally demodulates the modulated carrier signal delivered from the reception antenna 21, and then the digitally coded signal is delivered to the decoder 24, which then decodes the digitally coded signal delivered from the digital demodulator 23. Then, the decoded and reproduced reception signal is delivered to the receiver 25, whereas the control data is delivered to the control circuit 31.

The control section comprises the following; a control circuit 31, a transmission switch (not shown), a dial key unit (not shown), a received electric-field detecting circuit (not shown), a display unit like a liquid crystal display 32, a speaker unit 33, and a mode assigning switch 34. Not only the telephone number of the engaged party under communication, but the display unit 32 also displays the entered radio communication format, in other words, either the digital mode or the analog mode. When the digital mode is shifted into the analog mode, the speaker unit 33 generates an alarm. User of the mobile radio station can operate the mode assigning switching 34 in order to designate either the digital mode or the analog mode whichever the one desired by the user himself.

As shown in FIG. 3 for example, the control circuit 31 comprises those main components including a CPU 71, a ROM 72, and a RAM 73. Furthermore, in addition to a conventional radio circuit connection control circuit 74, the control circuit 31 also incorporates a mode data transmission control circuit 75, a mode display control circuit 76, and an alarm control circuit 77. For example, when originating a call, the mode data transmission control circuit 75 inserts a specific mode data designated by the mode assigning switch 34 into the control data before transmission to the base station BS. When a specific mode of the available speech channel is determined, the mode display control circuit 76 displays the entered mode on the display unit 32. Even when the digital mode is specified by the mode assigning switch 34, if the base station BS still assigns the analog-mode speech channel, or when the "hand-off" control operation is executed, specifically, if the available speech channel is shifted to a speech channel of another base station BS as a result of travel of the mobile radio station PS from one radio zone to another, and if the digital-mode speech channel is shifted into the analog mode, then the alarm control circuit 77 drives the speaker unit 33 to generate an alarm warning the communicating parties of this shift.

Instead of the above structure, the control circuit 31 may also comprise a microcomputer so that the microcomputer itself can execute all the functional operations of the radio circuit connection control circuit 74, the mode data transmission control circuit 75, the mode display control circuit 76, and the alarm control circuit 77.

Likewise, each of those base stations BS1 through BS3 comprises the transmission section, reception section, and the control section as shown in FIG. 2. Of these, the transmission section comprises the following; a hybrid circuit 41 which connects both the transmission section and the reception section to the wire circuit CL, an analog modulator (A-TX) 42, a digital modulator (D-TX) 43, a coder (COD) 44, and a transmission antenna (TXANT) 45. The analog modulator 42 angle-modulates a carrier signal by applying a communication signal received via the wire circuit CL and the control data output from a control circuit (CONT) 61. The coder 44 digitally encodes analog communication signals received via the wire circuit CL and the control signal output from the control circuit 61. The digital modulator 43 digitally modulates the carrier signal by means of a coded transmission voice signal and a coded control data output from the coder 44. In response to the switching instruction from the control circuit 61, the transmission antenna 45 alternatively switches the modulated carrier signal output from the analog modulator 42 and the modulated carrier signal from the digital modulator 43 before transmitting these carrier signals to the radio circuit.

On the other hand, the reception section of each base station BS comprises the following; a reception antenna (RXANT) 51, an analog demodulator (A-RX) 52, a digital demodulator (D-RX) 53, and a decoder (DEC) 54. On receipt of the modulated carrier signal from a mobile radio station PS via a wire circuit, in response to the switching instruction from the control circuit 61, the reception antenna alternatively delivers the received modulated carrier signal to the analog demodulator, 52 or the digital demodulator 53. The analog 52 angle-demodulates the modulates carrier signal delivered from the reception antenna 51. Then, the reproduced communication signal is delivered to the wire circuit CL via the hybrid circuit 41, whereas the control data is delivered to the control circuit 61. The digital demodulator 53 digitally demodulates the modulated carrier signal delivered from the reception antenna 51. The decoder 54 decodes the coded transmission talking signal and the coded control data output from the digital demodulator 53. Then, the reproduced speech signal is transmitted to the wire circuit CL via the hybrid circuit 41, whereas the control data is delivered to the control circuit 61.

Figure 4:
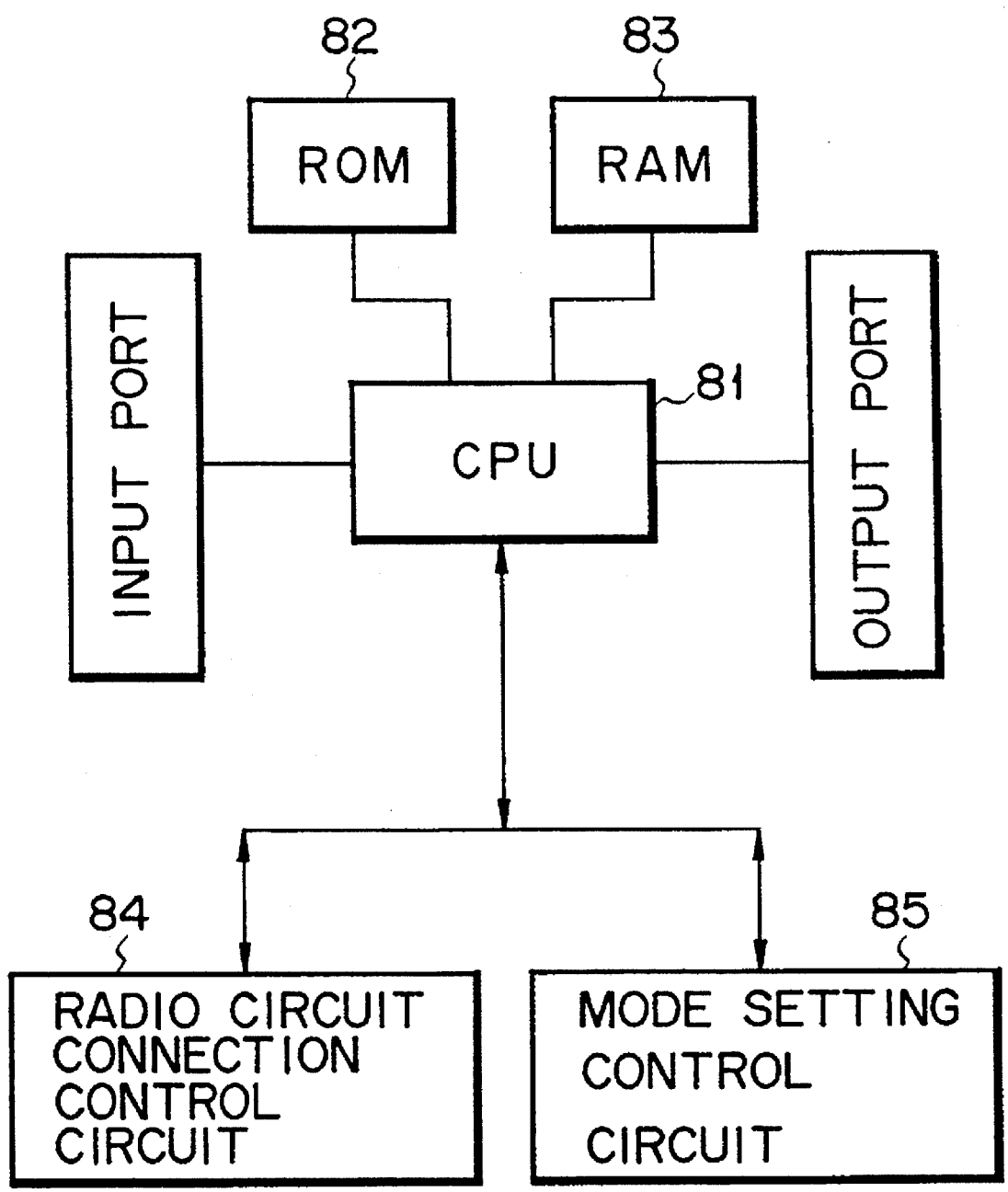
FIG. 4 schematically shows the control circuit of the base station shown in FIG. 2.

In addition to a reception signal detecting circuit (not shown) and an electric field detecting circuit (not shown), the control section of each base station BS also incorporates the control circuit 61. As shown in FIG. 4, the control circuit 61 is structurally identical to the other control circuit 31 shown in FIG. 3. Likewise, the control circuit 61 incorporates those main components including a CPU 81, a ROM 82, and a RAM 83. In addition to a conventional radio circuit connection control circuit 84, the control circuit 61 also incorporates a mode setting control circuit 85. When the digital mode is specified by the mode data delivered from a mobile radio station PS in the course of transmission, the mode setting control circuit 85 preferentially selects the digital communication channel. In the event that no specific mode is designated, then, according to the actual condition of use, the mode control circuit 85 unilaterally selects a proper speech channel from those analog and digital speech channels.

Next, functional operation of the cellular radio communication system embodied by the invention is described below.

Figure 5A:
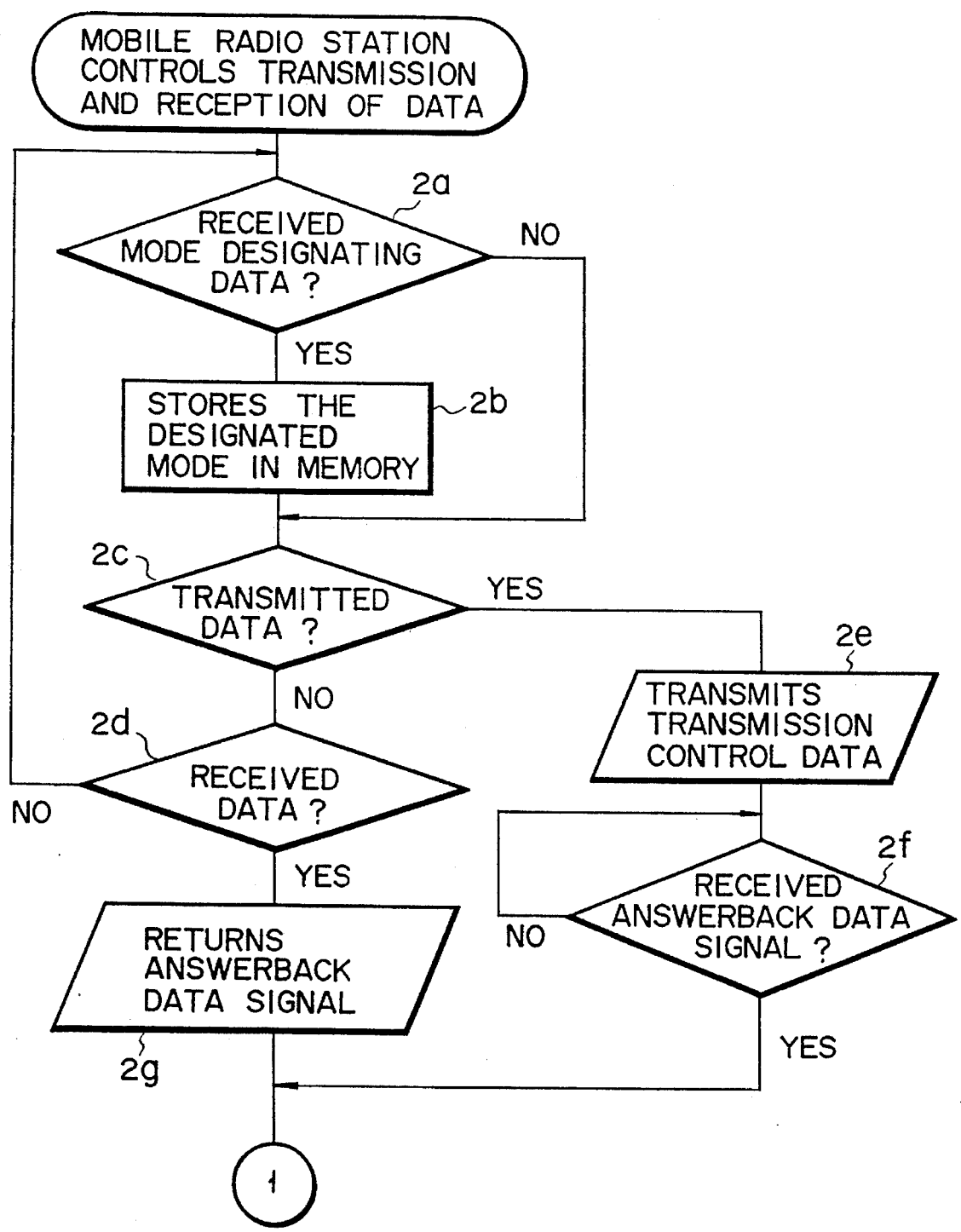
FIGS. 5A through 8 respectively show operational flowcharts each describing the sequence for controlling the mobile radio station and the base station of the cellular radio communication system shown in FIG. 1.

While a standby mode is set, the control circuit 31 causes the mobile radio station PS to repeatedly execute those sequential steps ranging from step 2a to step 2d shown in FIG. 5A. Specifically, when step 2a is executed, the control circuit 31 of the mobile radio station PS checks to see if a specific radio communication format is designated by the mode assigning switch 34. While this condition is present, assume that the user inputs the digital mode, for example, by operating the mode assigning switch 34 before engaging in a transmitting operation. Then, while the following step 2b is executed, a data indicating the entry of the designated digital mode is stored in the RAM 73 of the control circuit 31. Conversely, if the user inputs the analog mode by operating the mode assigning switch 34, then, while step 2b is executed, a data indicating the entry of the designated analog mode is stored in the RAM 73 of the control circuit 31.

while steps 2c and 2d are executed, the control circuit 31 checks to see if the transmission has already been originated. The control circuit 31 also checks to see if the reception control signal has already been received by the mobile radio station PS. While this condition is present, assume that the user originates a transmission by operating a transmission switch (not shown). This executes step 2e, in which a transmission control data is initially prepared and then transmitted to the base station BS. In addition to a variety of data needed for transmitting the identification number of the transmitting party, the mode designating data stored in the RAM 73 is also inserted in the transmission control data before being transmitted to the base station BS. After completing transmission of this transmission control data to the base station BS, step 2f is executed, in which the control circuit 31 of the mobile radio station PS checks to see if the response data signal has already been transmitted from the base station BS.

Figure 6:
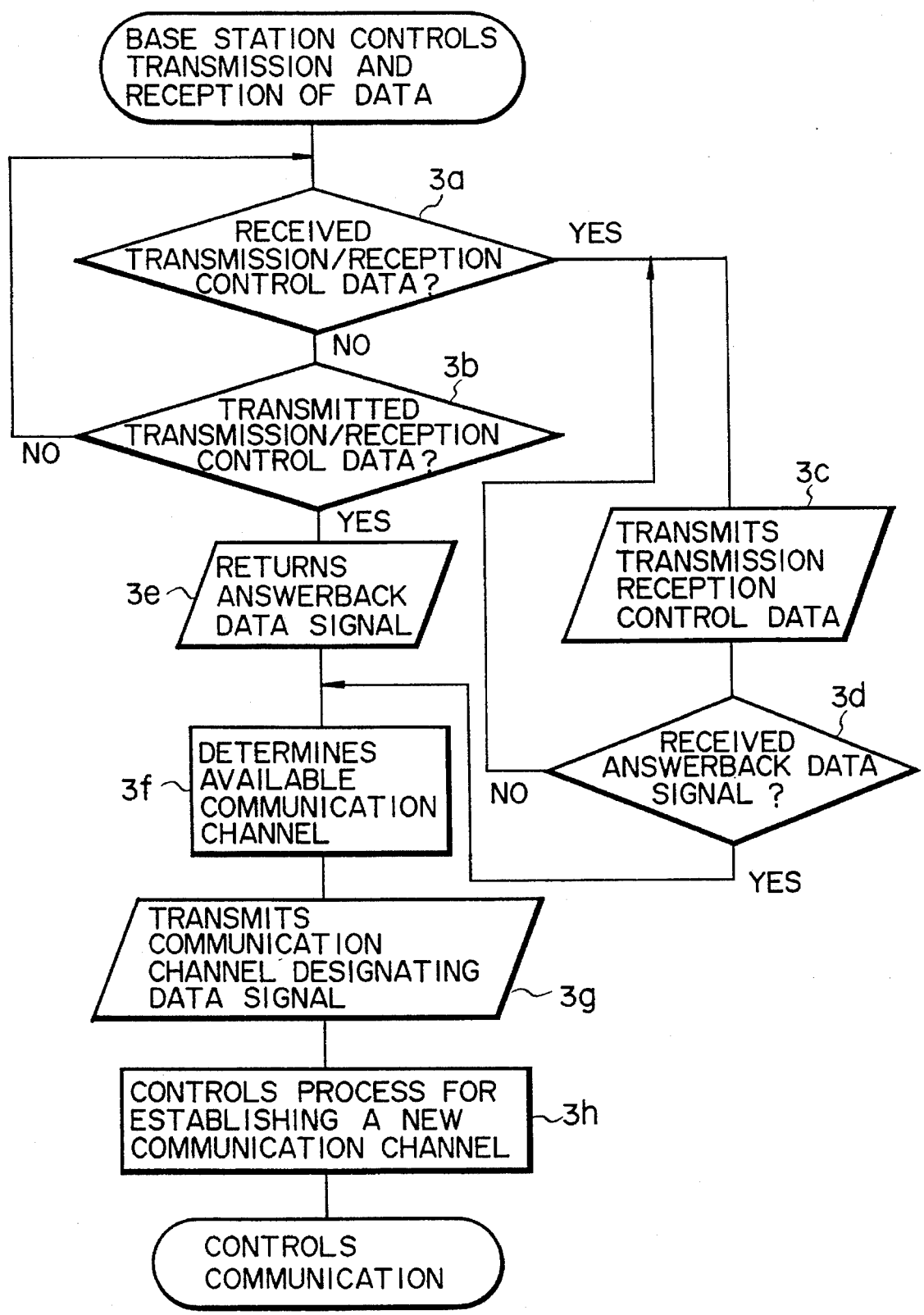

In response to this, as shown in FIG. 6, while steps 3a and 3b are executed, the control circuit 61 of the base station (BS1 for example) repeatedly checks to see if the incoming signal has already arrived at the base station BS1 from the wire telephone network NW via the wire circuit CL1. The control circuit 61 also repeatedly checks to see if the transmission control data has already been transmitted from the mobile radio station PS. While this condition is present, when the transmission control data arrives at the base station BS1 for example from the mobile radio station PS through the control channel, then step 3e is executed, in which the base station BS transmits the response data signal to the mobile radio station PS through the control channel.

When an incoming signal has arrived at the base station BS1 from the wire telephone network NW, step 3c is executed, in which the base station BS1 prepares the incoming-signal control data for transmission to the mobile radio station PS through the control channel.

After completing transmission of the incoming-signal control data to the mobile radio station PS, step 3d is executed, in which the base station BS1 awaits the arrival of the response data signal from the mobile radio station PS through the control channel. On the other hand, when the arrival of the incoming-signal control data is detected in the course of step 2d, the following step 2g is executed, in which the mobile radio station PS prepares the response data signal and then transmits it to the base station BS1. The mode designating data stored in the RAM 73 is inserted in the response data signal before being transmitted to the base station BS1.

After completing reciprocation of the response data signal (or detection of the response data signal) between the base station BS1 and the mobile radio station PS, step 3f is executed, in which the base station BS1 executes those processes needed for determining the usable speech channel by activating operation of the control circuit 61. Specifically, the base station BS1 searches any vacant speech channel from those analog and digital communication channels controlled by the base station BS1 itself. The base station BS1 selects an optimal channel from those vacant speech channels in response to the mode designating data transmitted from the mobile radio station PS. For example, if the mode designating data specifies the use of the digital mode, then the base station BS1 selects any of those vacant digital communication channels. Conversely, if mode designating data specifies the use of the analog mode, then the base station BS1 selects any of those vacant analog communication channels. On the other hand, even though the use of the digital mode is specified by the mode designating data, if there were no vacancy in the digital communication channels, then the base station BS1 alternatively selects any vacant analog communication channel. Conversely, even though the use of the analog mode is specified by the mode designating data, if there were no vacancy in the analog communication channels, then the base station BS1 alternatively selects any vacant digital communication channel.

Following the selection of the available communication channel in the course of step 3f, step 3g is executed, in which the base station BS1 operates the control circuit 61 in order to prepare a data needed for designating a specific communication channel, and then transmits the prepared data to the mobile station PS. The data prepared for designating the available communication channel contains the practically available communication channel number and the kind of the practically available communication channel, in other words, a data which specifies the use of either the digital channel or the analog channel.

The reciprocation of those control data between the mobile radio station PS and the base station BS1 thus far described is executed by applying a control channel which is solely available for the analog mode.

Figure 5B:
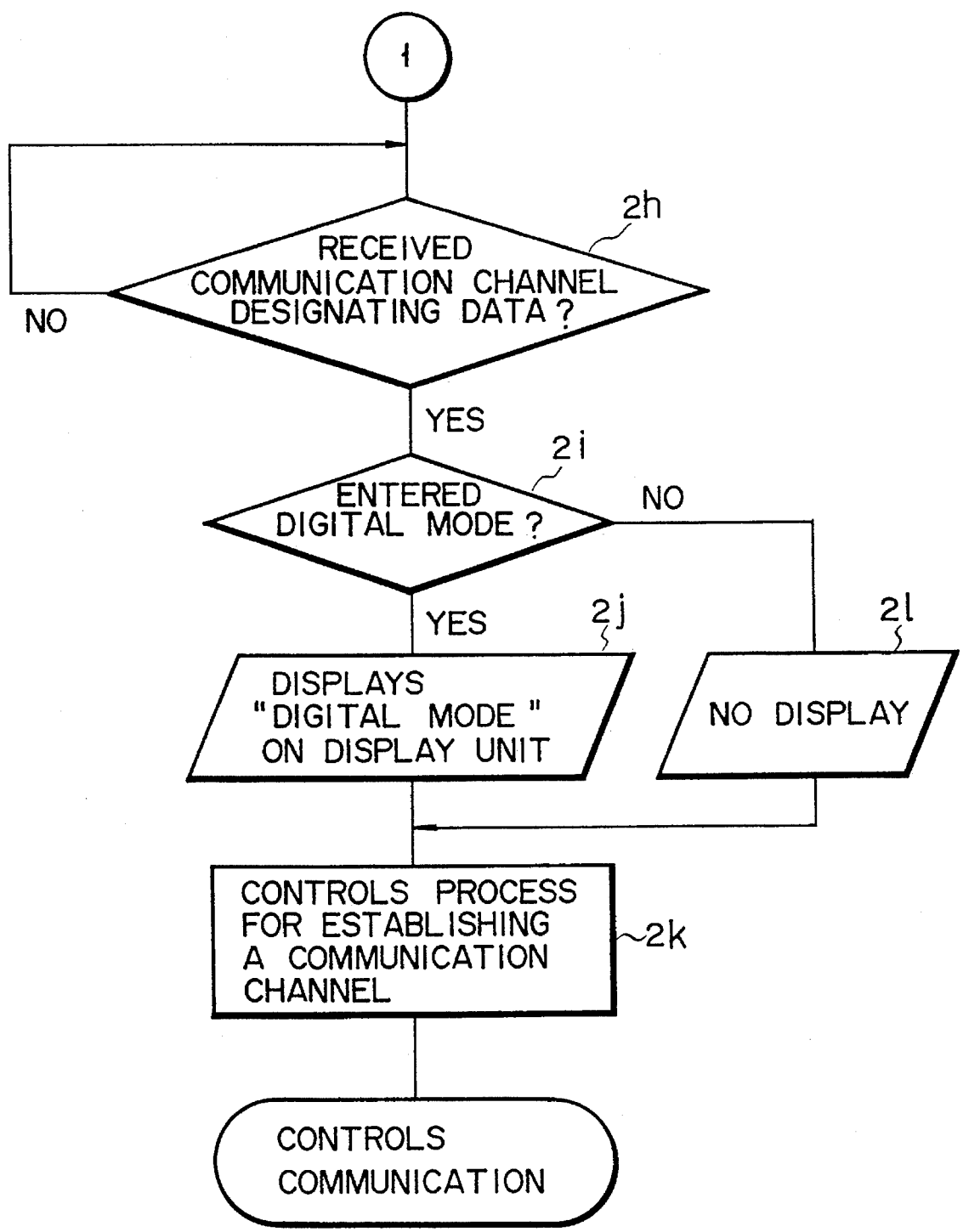

Referring to FIG. 5B, while step 2h is executed, the radio station PS checks via the control circuit 31 to see if the data for designating the practically available communication channel has already arrived at the base station BS1. On receipt of this data, step 2i is executed, in which the mobile radio station PS identifies the kind of the available communication channel based on the received channel designating data. When any of the those digital communication channels is designated, step 2j is executed, in which the display unit 32 displays the "digital mode". On the other hand, if the analog communication channel were designated, then step 2l is executed so that nothing can be displayed on the display unit 32. As a result, the user can visually identify that the following communication can be executed by applying the digital mode or the analog mode by merely looking at the content of the display unit 32.

Simultaneous with the display of the kind of the practically available communication channel on the display unit 32 of the mobile radio station PS, synchronizing and training operations needed for establishing the designated communication channel are reciprocated between the mobile radio station PS and the base station BS1. After entering into the state in which users can exchange speech communication via the established communication channel, both the mobile radio station PS and the base station BS1 enter into the communicating condition.

Figure 8:
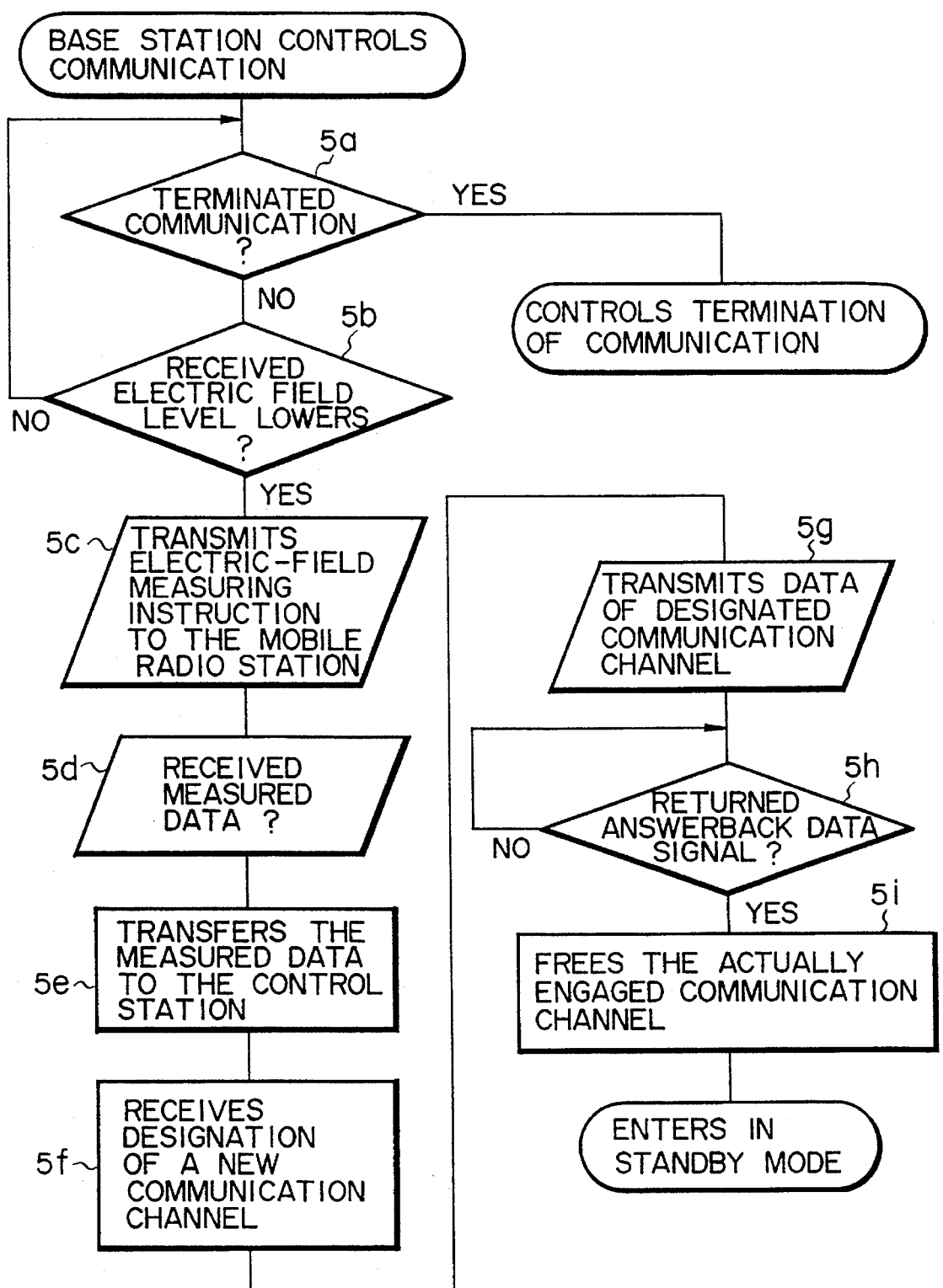

When the communicating condition is entered, as shown in FIG. 8 for example, step 5a is executed, in which the base station BS1 operates the control circuit 61 to repeatedly check to see if the communication via the selected channel has already been terminated. Next, step 5b is executed, in which the base station BS1 also operates the control circuit 61 to repeatedly check to see if the received electric field intensity is below the predetermined level. While this condition is present, assume that the radio zone E1 of the base station BS1 engaged in the communication with the users is shifted to the radio zone E2 of another neighboring base station BS2. Then, the intensity of the received electric field of those electric waves arriving at the base station BS1 from the mobile radio station PS decreases. The decreased intensity of the received electric field is identified by the base station BS1 in the course of step 5b. In response to this, the following step 5c is executed, in which the base station BS1 transmits an electric-field-intensity checking instructing data to the mobile radio station PS. In other words, the base station BS1 starts to control an operation needed for switching the available communication channel. Specifically, the base station BS1 starts up a control operation in order to execute the "hand-off" process.

Figure 7A:
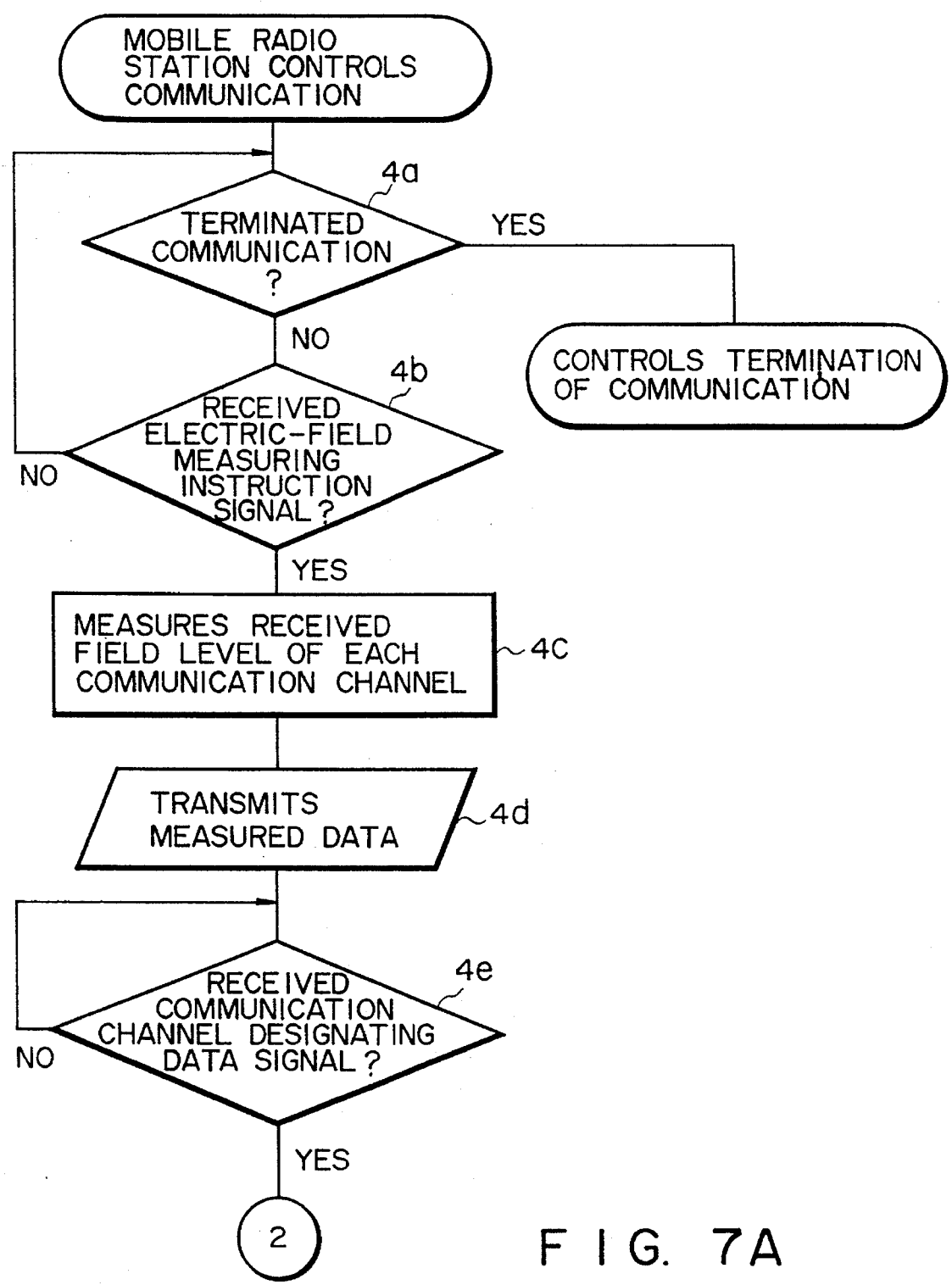

On the other hand, while the communication is executed in presence of step 4a shown in FIG. 7A, the mobile radio station PS operates the control circuit 31 to repeatedly check to see if the communication via the selected channel has already been terminated. In addition, while the following step 4b is executed, the control circuit 31 also repeatedly checks to see if the electric-field-intensity checking instructing data signal has already been received from the base station BS1. While this condition is present, on arrival of the field intensity checking instructing data signal from the base station BS1, the mobile radio station PS starts a control operation for executing the "hand-off" process in conjunction with the base station BS1. In other words, when step 4c is executed, the mobile radio station PS detects the actual intensity of the received electric field of the speech channel engaged in communication and also the actual intensity of the received electric field of other communication channels remaining in the receivable state. Then, the mobile radio station PS transmits the data of the detected field intensity to the base station BS1.

When the base station BS1 receives the data of the detected field intensity from the mobile radio station PS in the course of step 5d shown in FIG. 8, the base station BS1 then transfers these data to the control circuit CS in the following step 5e. The control circuit CS constantly surveys and is fully aware of the used condition of the activated communication channels of all the base stations BS1, BS2, ... BSn. Therefore, based on the data of the detected field intensity, the control circuit CS initially selects available communication channels containing the received electric field intensity beyond the predetermined level, and then further selects vacant channels. The control circuit CS then informs the base station BS1 of the selected channel on the way of step 5f. On receipt of the data of the selected communication channel, step 5e is executed, in which the base station prepares the data of the designated communication channel, and then transmits the prepared data to the mobile radio station PS.

Figure 7B:
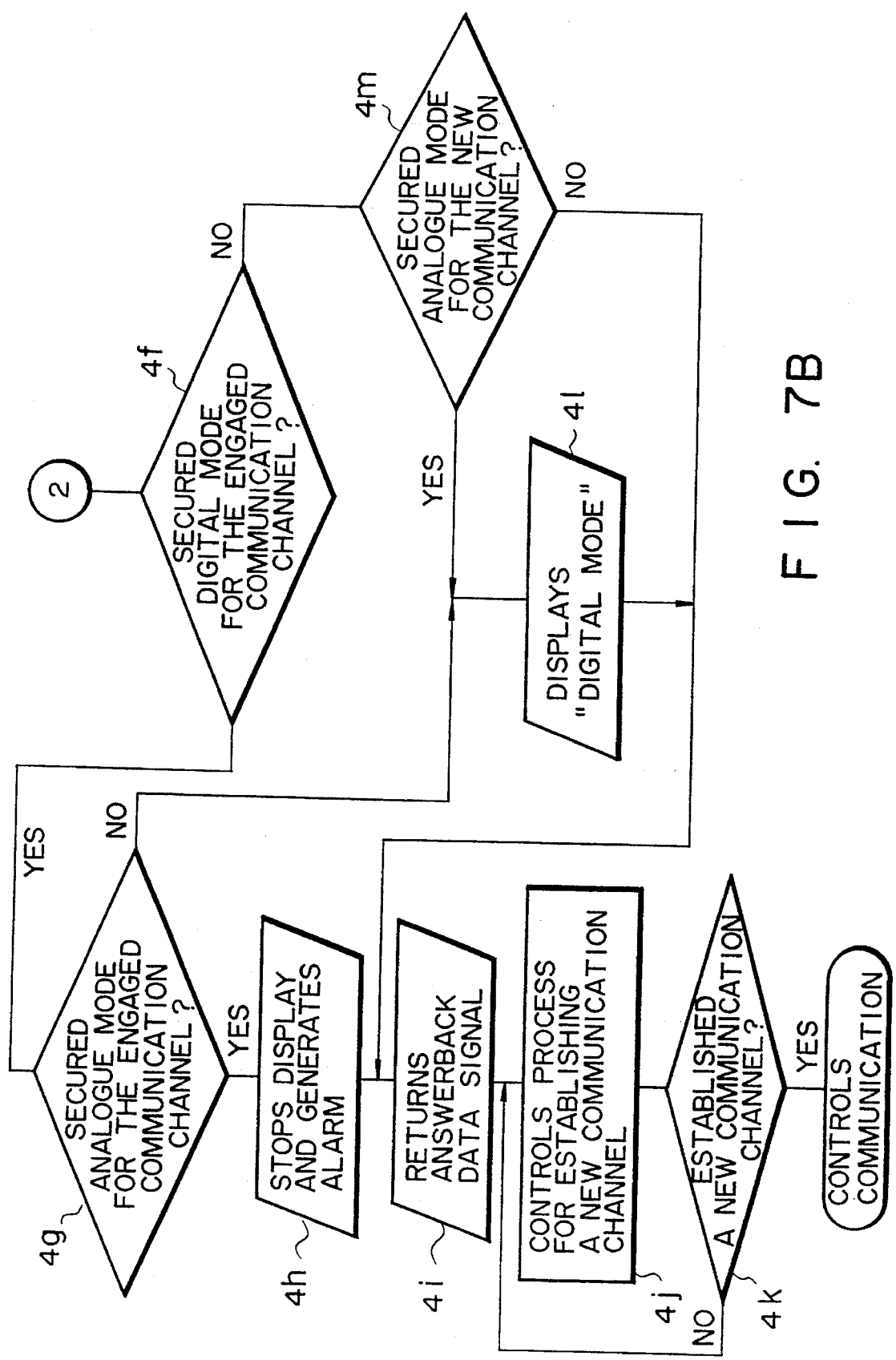

After confirming the receipt of the data of the designated communication channel from the base station BS1 in the course of step 4e, as shown in FIG. 7B, the following step 4f is executed, in which the mobile radio station PS identifies whether the available communication channel is of the digital mode. Furthermore, while step 4g or 4m is executed, the mobile radio station PS identifies whether the analog mode is set to the communication channel newly designated by the base station BS1. In other words, if the actually engaged communication channel remains in the digital mode, and yet, in the event that the analog mode is set to the communication channel newly designated by the base station BS1, in other word, when the actually engaged communication channel is shifted from the digital mode to the analog mode as a result of the execution of the "hand-off" process, then step 4h is executed, in which the display of the "digital mode" on the display unit 32 is erased. Simultaneously, the speaker unit 33 generates alarm to warn the user of the state in which the actually engaged communication channel has been shifted from the digital mode to the analog mode. This in turn permits the user to securely detect that the actually engaged communication channel has been shifted from the digital mode to the analog mode on the way of following up a communication with the opposite party. In response to this alarm, the communicating parties can provisionally discontinue the exchange of confidential communication requiring security, and then they can switch the subject over to conventional matters without minding about security.

On the other hand, in the event that the digital mode is applied to the actually engaged communication channel, and yet, if the digital mode is also applied to the actually engaged communication channel, then step 4l is executed, in which the display unit 32 continuously displays the "digital mode". On the other hand, if the actually engaged communication channel uses the analog mode, and conversely, if the newly designated communication channel introduces the digital mode, then the mobile radio station PS causes the display unit 32 to display the "digital mode" while step 4l is executed.

Figure 10:
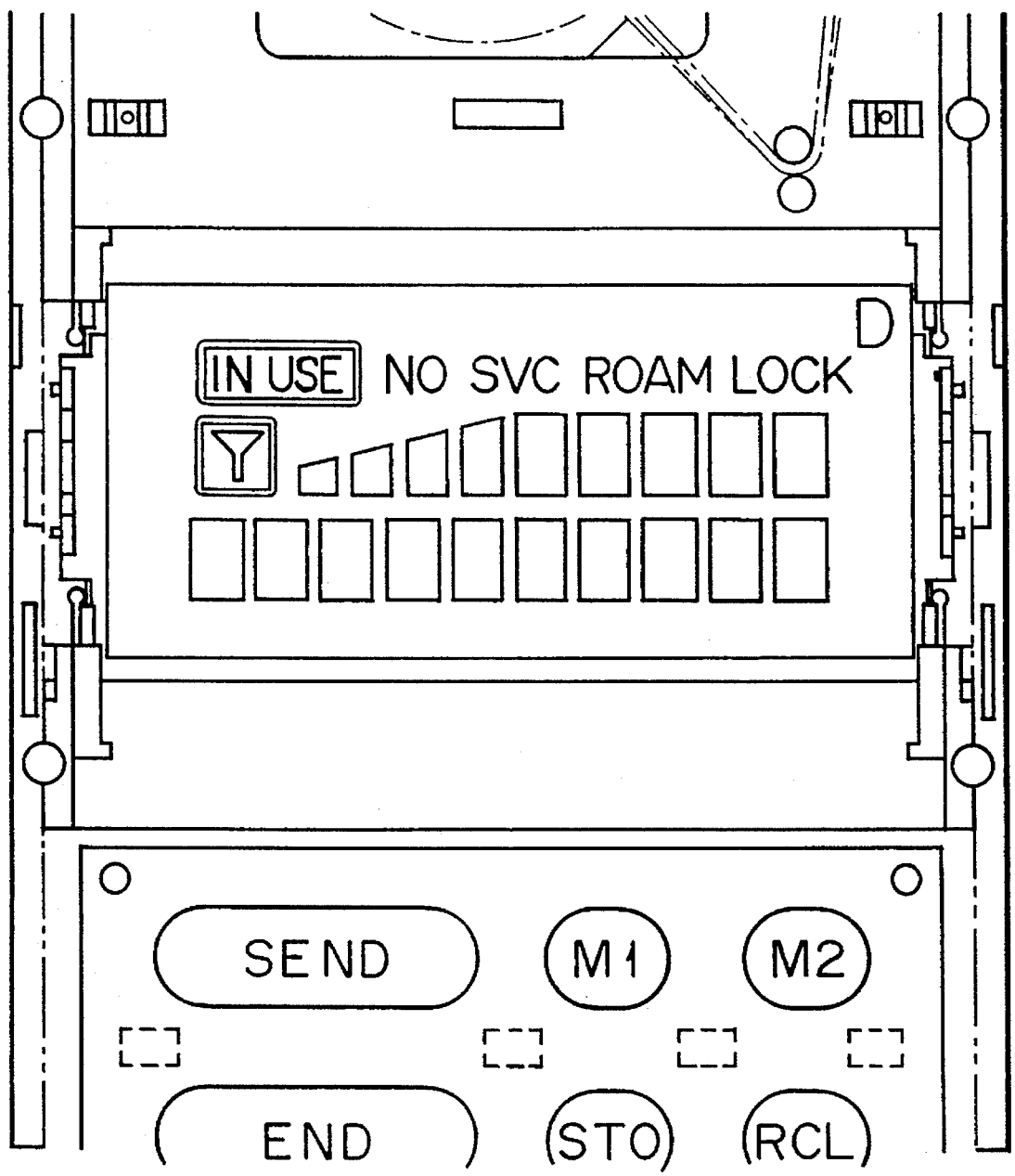
FIG. 10 shows an enlarged view of the display unit of the mobile radio station shown in FIG. 9.

When using such a mobile radio station PS like the one shown in FIG. 9, if the digital mode were designated, then, the display unit 32 displays a capital character "D" at the upper right corner of the display screen shown in FIG. 10. Conversely, if the analog mode were designated, then the display unit 32 displays a capital character "A" at the identical position instead of "D".

After completing those control operations needed for displaying the designated mode of the actually engaged communication channel, step 4i is executed, in which the mobile radio station PS transmits an response data signal to the base station BS1 with which the communication is engaged. Next, step 4j is executed, in which the mobile radio station PS executes a control operation needed for establishing a new communication channel. The mobile radio station PS exchanges control data with another base station BS2 in order that the newly established communication channel can be provided with synchronizing and training processes. When the newly established communication channel is fully prepared to execute a communication, the base station BS1 returns to the communication control routine. Based on those processes thus far mentioned, the "hand-off" process from the communication channel owned by the base station BS1 to the communication channel controlled by another base station BS2 is executed.

Next, step 5h is executed, in which the base station BS1 thus far engaged in the communication confirms the arrival of the response data signal from the mobile radio station PS, and then step 5i is executed, in which the base station BS1 frees the communication channel thus far solely being engaged, and then the base station BS1 returns itself to the standby mode.

As is clear from the above description, the cellular radio communication system embodied by the invention provides the mobile radio station PS with the mode assigning switch 34. Then, the mobile radio station PS transmits the mode designating data entered by operating the mode assigning switch 34 to the base station BS in order to permit the base station BS1 to determine the engageable communication channel based on the mode designating data. This in turn permits the user on the part of the mobile radio station PS to specify the desired communication format to be either the digital mode or the analog mode as required. As a result, the user can securely follow up communication based on the optimal format according to the content of communication. For example, if the user desires to engage in a confidential communication requiring security, he can securely follow up communication in the well-secured condition by specifically designating the digital mode. On the other hand, when the user makes a conventional communication without requiring security, he can merely designate the entry of the analog mode, or he can freely engage in a communication without specifying the available mode.

Furthermore, according to the invention, since the actually entered mode of the engaged communication channel is displayed on the display unit 32, the user can always be aware of the actually entered radio communication format whether being the analog mode or the digital mode while he follows up the communication. Therefore, even when the user does not specifically designate the entry of the digital mode on the part of the mobile radio station PS, if the base station BS1 selects the digital mode, then, the user can engage in the well-secured communication after confirming that he can follow up confidential talk under security. On the other hand, even when the user specifically designates the entry of the digital mode, if there were no vacancy on the part of the digital communication channels, then, the base station BS1 is obliged to alternatively set the analog mode. In response to this situation, the user can refrain himself from exchanging a confidential communication that requires security.

Furthermore, according to the invention, as a result of the executing of the "hand-off" process on the way of exchanging communication, if the actually engaged communication channel were shifted from the digital mode to the analog mode, then the mobile radio station PS generates alarm to warn the user of the change of the actually engaged communication channel so that the user can easily be aware of this shift. In response to this alarm, the user can immediately suspend the exchange of confidential communication thus far available under the digital mode. Instead, the user can change the subject over to any conventional matter for example, or he can once terminate the communication, and then, he can again request for the engagement with the digital communication channel.

Next, another embodiment of the invention is described below. Characteristically, the second embodiment provides the mobile radio station with a special means which receives a signal designating the rejection against the shift of the functional mode of the radio communication format. Specifically, as a result of the executing of the "hand-off" process, if the communication channel engaged with the digital mode were shifted into the analog mode, in response to this, assume that the user operates a mode-shift rejecting switch to reject the shift of the functional mode, and then the entered content is transmitted from the mobile radio station PS to the base station BS1, and then, in response to this, further execution of the "hand-off" process is discontinued.

Figure 11A:
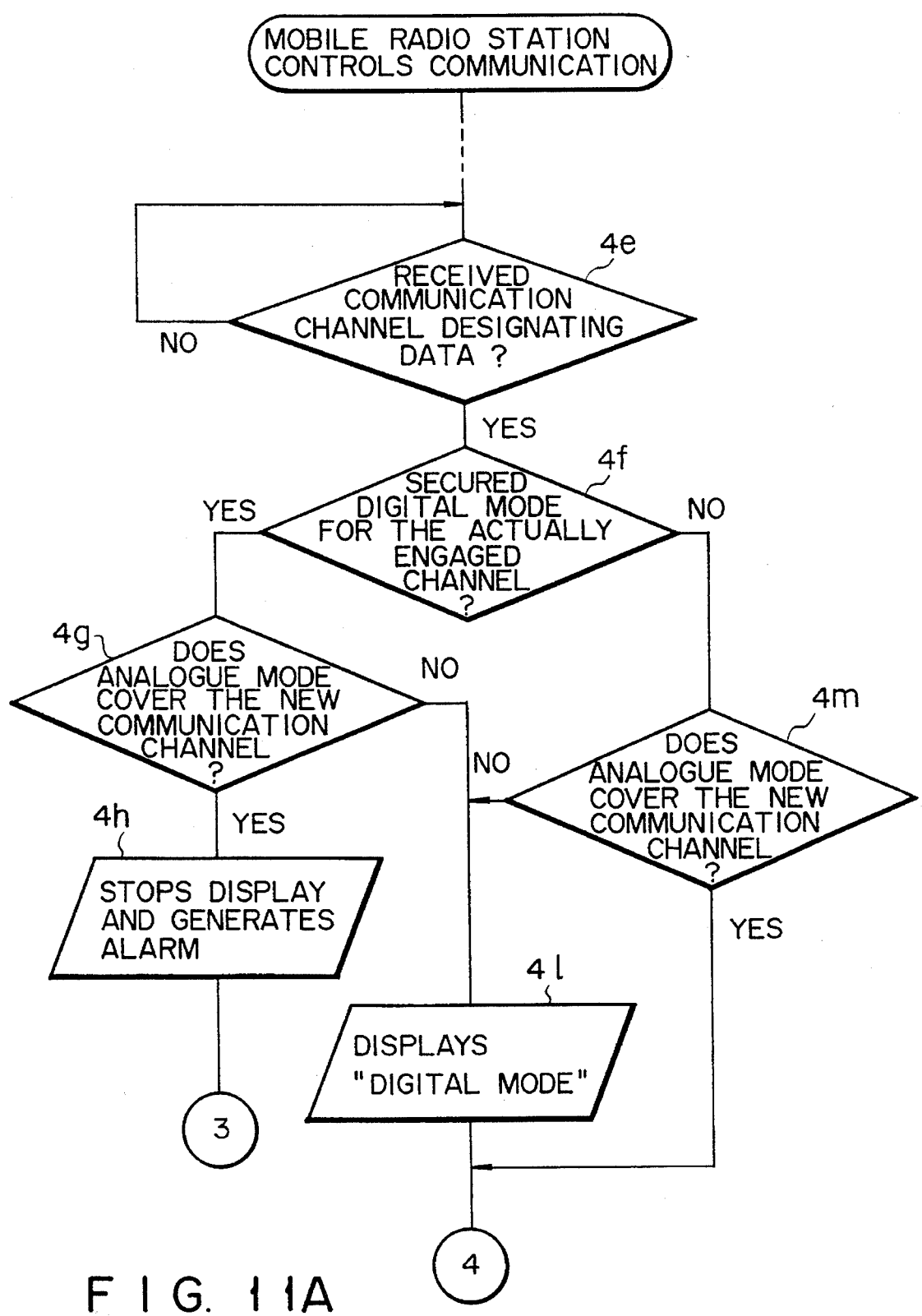
Figure 11B:
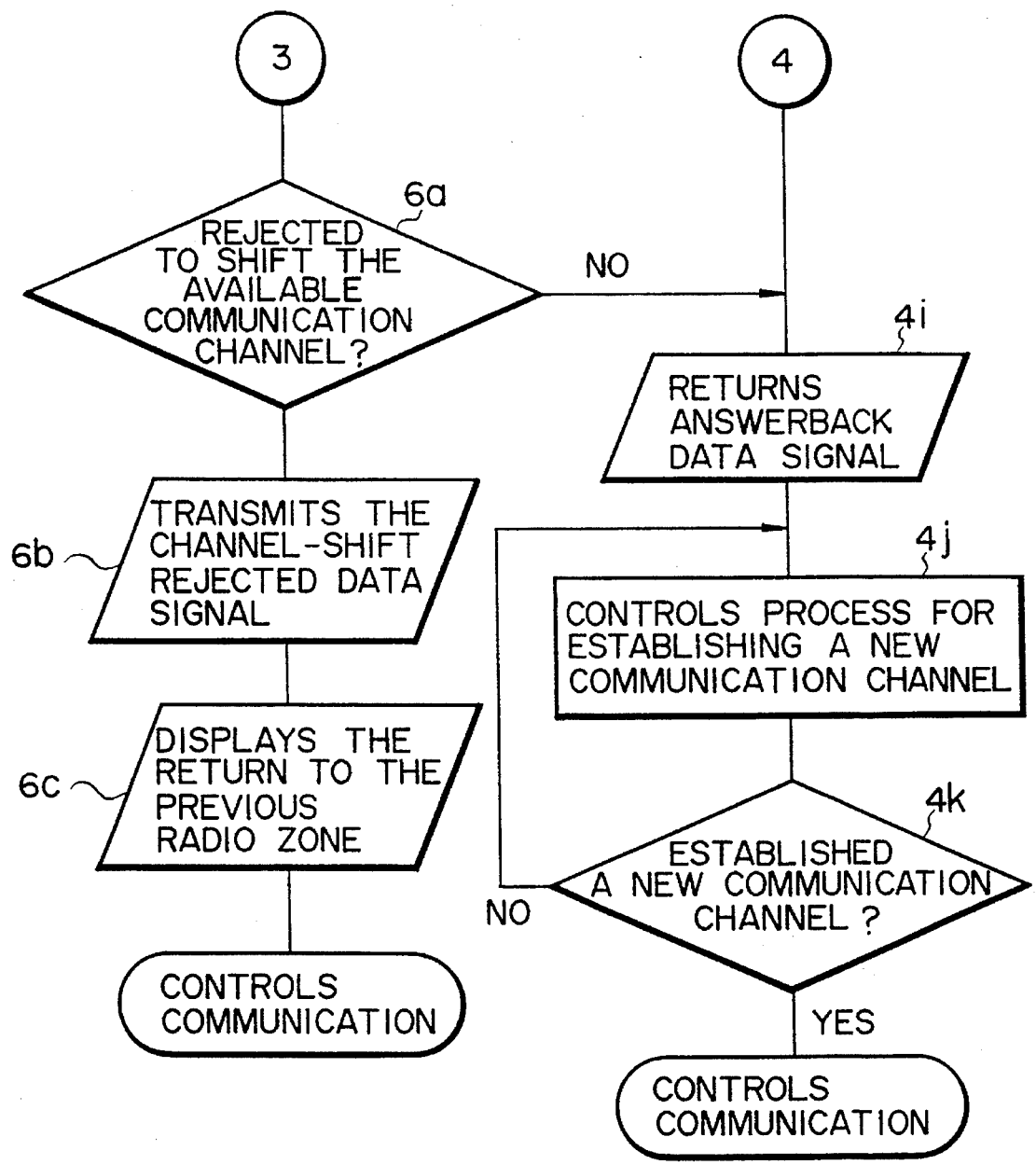

More particularly, as a device for entering a signal to reject the shift of the operating mode of the radio communication format, the mobile radio station PS incorporates a mode-shift rejection switch. As a result of the executing of the "hand-off" process, if the communication channel engaged with the digital mode were shifted into the analog mode, then, in response to this, step 4h is executed, in which the control circuit 31 of the mobile radio station PS erases the display of the "digital mode" as shown in FIG. 11A, and simultaneously generates alarm. Next, step 6a shown in FIG. 11B is executed, in which the control circuit 31 identifies whether a signal designating the rejection against the shift of the operating mode of the engaged communication channel generated by the mode shift rejecting switch has already been entered. If the entry of the mode shift rejecting signal were identified, then step 6b is executed, in which the control circuit 31 prepares a channel mode shift rejection data, and then transmits this data to the base station BS1. Next, step 6c is executed, in which the control circuit 31 operates the display unit 32 to display a message demanding that the radio zone prior to the shift of the operating mode be restored, and then the control circuit 31 resumes own routine to control overall communication.

While step 6c is executed, if the mode shift rejecting signal were not input in a predetermined period of time after generation of alarm, then the control circuit 31 identifies that the shift of the operating mode has been accepted, and then step 4i is executed, in which the mobile radio station PS transmits an response data signal to the base station BS1. Then, as mentioned earlier in reference to FIG. 7, step 4j is executed, in which the mobile radio station PS executes a control operation to establish a new communication channel. Next, step 4k is executed in which the control circuit 31 confirms that the exchange of communication can be executed, and then permits the mobile radio station PS to enter into a communication via the newly provided communication channel.

On the other hand, as shown in FIG. 12, after transmitting the communication channel designating data signal and while step 5h is executed, the control circuit 61 of the base station BS repeatedly checks to see if the response message has already been sent back to the mobile radio station PS, or not. Likewise, while step 7a is executed, the control circuit 61 repeatedly checks to see if the mode shift rejecting data signal has already been sent back to the mobile radio station PS. In presence of this condition, the mobile radio station PS transmits the mode shift rejecting data signal to the base station BS, and then step 7b is executed, in which the base station BS cancels to shift the communication channel, and instead, the base station BS retains the actually engaged communication channel before resuming a normal routine to control the communication. Simultaneously, the mobile radio station PS transfers a data to the control station CS to inform that the shift of the communication channel has been cancelled. On receipt of the response data signal from the mobile radio station PS on the way of step 5h, the following step 5i is executed to free the communication channel.

According to the second embodiment, as a result of the execution of the "hand-off" process, when the digital mode of the actually engaged communication channel is shifted into the analog mode, the user can reject the shift of the selected mode, and yet, when the radio zone prior to the shift of the entered mode is restored as per the advice message shown on the display unit 32, the user can freely follow up a confidential communication via the available communication channel engaged with the digital mode. Therefore, according to the cellular radio communication system embodied by the invention, unlike the conventional system, it is no longer necessary for the user to suspend confidential communication due to the shift of the entered mode and then provisionally terminate the communication before resuming the communication by specifically designating the digital mode.

It should be understood however that the scope of the invention is not solely defined to those embodiments thus far described. For example, each of the above embodiments displays the entered operating mode of the radio communication system on the display unit 32 to inform the user of the actually available mode. Instead, it is also practicable for the cellular radio communication system of the invention to output alarm or vocal message from a speech-receivable speaker unit 33 to inform the user of the actually entered operating mode. Although each of those embodiments thus far described merely displays the digital mode, the display unit 32 can also display the entered analog mode.

Furthermore, each of the above embodiments causes the mobile radio station PS to directly inform the user of the actually entered radio communication mode by a display device. In addition to this, it is also practicable for each of those embodiments to cause the mobile radio station PS to generate a vocal message for example, and then transmit this message to the telephone unit of the speech-receiving party via a circuit so that the user of the opposite telephone unit can simultaneously be informed of the actually entered radio communication mode. Introduction of this system permits the user of the opposite telephone unit to simultaneously confirm the actually entered radio communication mode and judge himself whether he can still follow up exchange of a confidential communication.

Furthermore, each of the above embodiments establishes a communication channel by transmitting the mode assigning data signal from the mobile radio station PS to the base station BS simultaneous with the moment of originating the transmission and reception of the transmitted signal. Instead, it is also practicable for the embodiment of the invention to initially transfer the mode assigning data from the mobile radio station PS to the base station BS on the way of exchanging communication if only a specific operating mode were designated during the communication and then causes the base station BS to shift the communication channel.

Furthermore, it is also practicable for the embodiment of the invention to generate alarm several minutes (for example) later from the moment at which the digital communication channel was secured. This in turn allows the system to warn the users to be aware of prolonged confidential communication. Although the communication based on the digital mode provides reliable security, it is true that even the digital mode communication cannot perfectly assure security, and yet, the spoken content may potentially be tapped by any third party if the tapping system were properly arranged. To prevent this, the modified embodiment of the invention can warn the communicating parties to be aware of the tapping potentially incurred from the prolonged exchange of confidential communication by generating alarm after a certain while is past from the time of originating the communication between them.

It should be understood however that, not only to the automobile telephone system and the portable telephone system, but the cellular radio communication system embodied by the invention is also effectively applicable to a private radio telephone system or a small-scope cordless telephone system typically composed of a base station and a mobile radio station as a unit.

Furthermore, it should also be understood that a wide variety of modifications of the cellular radio communication system may also be materialized in a specific range without deviating from the spirit and the scope of the invention in such fields including the structure of base stations and mobile radio stations, or the structure of a sequence control means, or the structure of a means for entering the mode designating signal (for example, speech may be input by applying a speech identifying apparatus), or the like.

As is clear from the above description, the invention provides a novel cellular radio communication system which is characterized by those component facilities including the following; a plurality of mobile radio stations each incorporating a device for entering the designated operating mode and a device for informing the actually entered operating mode, in which either the digital mode or the analog mode is selectively designated for the radio communication system between each mobile radio station and each base station in order that the designated operating mode data can simultaneously be transmitted to the corresponding base station. On the other hand, each base station incorporates a device for setting the available radio communication format, where the base station selects a specific radio communication format in response to the mode designating data signal transmitted from the corresponding mobile radio station before entering into the designated operating mode.

Therefore, the invention provides an extremely useful cellular radio communication system to permit the user to optionally designate the desired format of radio communication so that the digital mode can more effectively be made available in particular.

Furthermore, the invention provides an extremely useful cellular radio communication system which characteristically provides a means for informing the actually available radio communication format, and yet, availing of this informing device, a specific radio communication format set between the base station and the mobile radio station, in other word, either the analog mode or the digital mode, can instantaneously be informed to the user.

In consequence, according to the invention, an extremely useful cellular radio communication system is securely provided, which permits the user to precisely understand the actually entered radio communication format so that he can optionally change the content of communication according to and in response to the actually entered radio communication format.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A mobile radio communication system comprising:
a base station apparatus connected to a wire network; and
a mobile radio station apparatus which is connected to said base station apparatus via a radio network, said mobile radio station apparatus including:
mode designating means for designating one of a plurality of modes;
mode-informing means for recognizing the mode designated by said mode designating means and transmitting mode data indicating only the designated mode to said base station apparatus via said radio network; and
shift rejecting means for rejecting a shift from the one designated mode to a non-designated mode during a hand-off process from said base station apparatus.

2. A mobile radio communication system according to claim 1, wherein said plurality of modes includes an analog mode and a digital mode, and said mode designating means includes input means for designating only one of the digital mode and the analog mode.

3. A mobile radio communication system according to claim 1, wherein said mode-informing means inserts the mode data into control data for transmission to said base station apparatus.

4. A mobile radio communication system according to claim 1, wherein said mode-informing means includes a memory for storing the mode data.

5. A mobile radio communication system according to claim 1, wherein said base station apparatus includes means for recognizing the mode data sent from said mobile radio station and means for executing radio communication there-with only with the designated mode indicated by the mode data.

6. The system of claim 1, wherein said shift rejecting means comprises a switch operable by a user of said mobile radio station apparatus and means for transmitting shift rejection information to said base station apparatus.

7. A mobile radio station apparatus comprising:

means for communicating, via a radio network, with a base station apparatus connected to a wire network;

mode designating means for designating one of a plurality of modes for communicating with said base station apparatus;

mode-informing means for recognizing said one designated mode designated by said mode designating means and transmitting mode data indicating said one designated mode to said base station apparatus via said radio network; and means for rejecting a shift from the one designated mode to a non-designated mode during a hand-off process from said base station apparatus.

8. The apparatus of claim 7, wherein said shift rejecting means comprises a switch operable by a user of said mobile radio station apparatus and means for transmitting shift rejection information to said base station apparatus.

9. The apparatus of claim 7, wherein said shift rejecting means comprises:

means for transmitting a mode-shift rejection signal to said base station apparatus when a digital mode of communication is changed to an analog mode of communication, and means for indicating to a user of said mobile radio apparatus that the user should return to a first radio zone to continue said digital mode of communication.

10. The apparatus of claim 7, wherein said mode designating means designates one of an analog mode and a digital mode.

11. A mobile radio station apparatus comprising:

means for communicating, via a radio network, with a base station apparatus connected to a wire network;

mode designating means for designating one of an analog mode and a digital mode for communicating with said base station apparatus;

mode-informing means for recognizing said one designated mode designated by said mode designating means and transmitting mode data indicating said one designated mode to said base station apparatus via said radio network; and indicating means, responsive to a message received from the base station apparatus, for indicating to a user whether the analog mode or the digital mode has been initiated between the mobile radio station apparatus and the base station apparatus.

12. The apparatus of claim 11, further comprising means for detecting whether the digital mode has been shifted to the analog mode, and generating an alarm to the user in response thereto.

13. The apparatus of claim 11, further comprising mode-shift rejection means, actuable by the user, for transmitting a mode-shift rejection signal to the base station apparatus to prevent the digital mode from being shifted into the analog mode.

* * * * *